(12) United States Patent
Miclea et al.

(10) Patent No.: US 9,007,941 B1
(45) Date of Patent: Apr. 14, 2015

(54) SELF-ORGANIZING AND SCALABLE MPLS VPN TRANSPORT FOR LTE

(75) Inventors: Horia Miclea, Epalinges (CH); Ruben Lobo, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 13/557,910

(22) Filed: Jul. 25, 2012

(51) Int. Cl.
  H04L 12/26 (2006.01)
  H04L 12/723 (2013.01)
  H04L 12/741 (2013.01)
  H04L 29/06 (2006.01)

(52) U.S. Cl.
  CPC .................. *H04L 29/0621* (2013.01)

(58) Field of Classification Search
  CPC .................. H04L 65/102; H04L 29/06224
  See application file for complete search history.

(56) References Cited

U.S. PATENT DOCUMENTS

| | | | |
|---|---|---|---|
| 7,447,167 B2 | 11/2008 | Nadeau et al. | |
| 7,746,793 B2 | 6/2010 | Nadeau et al. | |
| 7,940,777 B2 | 5/2011 | Asati et al. | |
| 8,098,663 B2 | 1/2012 | Guichard et al. | |
| 8,189,585 B2 | 5/2012 | Dharwadkar et al. | |
| 8,194,664 B2 | 6/2012 | Dharwadkar | |
| 8,467,411 B1* | 6/2013 | Minei et al. | 370/467 |
| 2009/0003350 A1* | 1/2009 | Guichard et al. | 370/392 |
| 2010/0246581 A1* | 9/2010 | Henry et al. | 370/392 |
| 2011/0182189 A1 | 7/2011 | Martini et al. | |
| 2013/0003740 A1* | 1/2013 | Zheng | 370/392 |

OTHER PUBLICATIONS

LTE World, Automatic Neighbour Relation, Apr. 20, 2010, pp. 1-3.*
Clove Technology, Guide to GSM, GPRS, EDGE, 3G, HSDPA, HSPA (plus) and LTE, Jul. 7, 2007, pp. 1-3.*
ARIN, IPv4 and IPv6, Feb. 10, 2009, p. 1.*
Interlab, Routing Protocol IS-IS, Sep. 26, 2005, pp. 1-27.*
MPLS Label Distribution Protocol, May 1, 2008, pp. 1-28.*
Freescale Semiconductor, Long Term Evolution Protocol Overview, Oct. 2008, pp. 1-21.*
Ravi Prakash, OSPF Version 2 (RFC 2328), Feb. 1, 2002, pp. 1-12.*
P. Michael Henderson, Fundamentals of SONET/SDH, Sep. 18, 2001, pp. 1-58.*
Troubleshooting Command Difference Between VPNv4 and VPNv6, Mar. 22, 2010, pp. 1-4.*
Cisco Systems, VPLS and VPWS-At-A-Glance, 2004, p. 1.*
Daniel Hu, LTE Interfaces-S1 and X2 in U-Plane/C-Plane, May 14, 2009, pp. 1-8.*
Rick Han, Chapter 4 Hierarchy, DHCP, ICMP, Apr. 1, 2002, pp. 1-26.*

(Continued)

*Primary Examiner* — Omar Ghowrwal
(74) *Attorney, Agent, or Firm* — Parker Ibrahim & Berg LLC; James M. Behmke; Stephen D. LeBarron

(57) ABSTRACT

In one embodiment, an access node of a network may receive a message that is destined for a particular address. The access node can determine that it does not have a border gateway protocol (BGP) label switched path (LSP) mapped for the particular address. The access node can further trigger an aggregation node to update outbound route filtering (ORF) to permit advertisements for the particular address. In response to the updated ORF of the aggregation node, the access node can receive via advertisements a BGP forwarding equivalent class (FEC) for an LSP mapped to the particular address. The access node can further transmit messages destined for the particular address from the access node to a subsequent node of the LSP according to the BGP FEC for the LSP.

22 Claims, 9 Drawing Sheets

(56) References Cited

OTHER PUBLICATIONS

Aggarwal, et al., "BGP Encodings and Procedures for Multicast in MPLS/BGP IP VPNs", IETF Trust, Network Working Group, Internet Draft, Oct. 2009, 61 pages.

Chen, et al., "Extended Community Based Outbound Route Filter for BGP-4", IETF Trust, Network Working Group, Internet Draft, Dec. 2011, 6 pages.

Chen, et al., "Outbound Route Filtering Capability for BGP-4", IEFT Trust, Network Working Group, Request for Comments 5291, Aug. 2008, 12 pages.

Leymann, et al., "Seamless MPLS Architecture", IETF Trust, MPLS Working Group, Internet-Draft, Mar. 2012, 48 pages.

Leymann, et al., "Seamless MPLS Architecture", IETF Trust, Internet Engineering Task Force, Internet-Draft, Mar. 2011, 47 pages.

Marques, et al., "Constrained Route Distribution for Border Gateway Protocol / Multiprotocol Label Switching (BGP/MPLS) Internet Protocol (IP) Virtual Private Networks (VPNs)", IETF Trust, Network Working Group, Request for Comments 4684, Nov. 2006, 14 pages.

Rekhter, et al., "Carrying Label Information in BGP-4", The Internet Society, Network Working Group, Request for Comments 3107, 8 pages, May 2001.

\* cited by examiner

SELF-ORGANIZING AND SCALABLE MPLS VPN TRANSPORT FOR LTE

TECHNICAL FIELD

The present disclosure relates generally to telecommunication networks, and, more particularly, to multiprotocol label switching (MPLS) virtual private network (VPN) transport for long term evolution (LTE) telecommunication networks.

BACKGROUND

Recent growth in the telecommunication industry and particularly in mobile data transmission is challenging legacy network infrastructure capabilities. In particular, the recent growth marks a shift from a dominance of voice transmission to a dominance of mobile data. In turn, this shift causes an ever-increasing capacity demand for new data-intensive hardware and software, and places pressure on service companies to improve speed and efficiency of data transmission and provide larger scalability, while maintaining (or even improving) the quality of service.

BRIEF DESCRIPTION OF THE DRAWINGS

The embodiments herein may be better understood by referring to the following is description in conjunction with the accompanying drawings in which like reference numerals indicate identically or functionally similar elements, of which.

DESCRIPTION OF EXAMPLE EMBODIMENTS

Overview

According to one or more embodiments of the disclosure, an access node of a network may receive a message that is destined for a particular address. The access node can determine that it does not have a border gateway protocol (BGP) label switched path (LSP) mapped for the particular address. The access node can further trigger an aggregation node to update outbound route filtering (ORF) to permit advertisements for the particular address. In response to the updated ORF of the aggregation node, the access node can receive via advertisements a BGP forwarding equivalent class (FEC) for an LSP mapped to the particular address. The access node can further transmit messages destined for the particular address from the access node to a subsequent node of the LSP according to the BGP FEC for the LSP.

According to one or more additional embodiments, an aggregation node can receive a request from an access node to permit advertisements destined for a particular address. The advertisements for the particular address can be filtered by outbound route filtering (ORF) at the aggregation node. The aggregation node can further update the ORF to permit the advertisements for the particular address. In response to the updated ORF, the aggregation node can transmit via the advertisements a border gateway protocol (BGP) forwarding equivalent class (FEC) for a label switched path (LSP) mapped to the particular address to the access node.

Notably, in addition to MPLS transport self-organization, VPN self-organization that triggers such MPLS transport self-organization is also described herein.

DESCRIPTION

As technology advances, concepts of conventional computer networks and network communication expand into various industries such as the mobile telecommunication networks. This expansion attempts to meet an ever increasing need for data capacity—both quantity and quality. The techniques, as described herein, provide for network models overlaid on existing telecommunication infrastructures (mobile and landline). In general, a network comprises geographically distributed nodes (e.g., devices is of a distributed data center or end-client devices such as cell phones, personal computers and workstations, or other devices) interconnected by communication links for transporting data between end nodes. Various types of network are available and can include, for example, remote access networks (RANs), local area networks (LANs), wide area networks (WANs), etc. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, and others.

Figure 1:
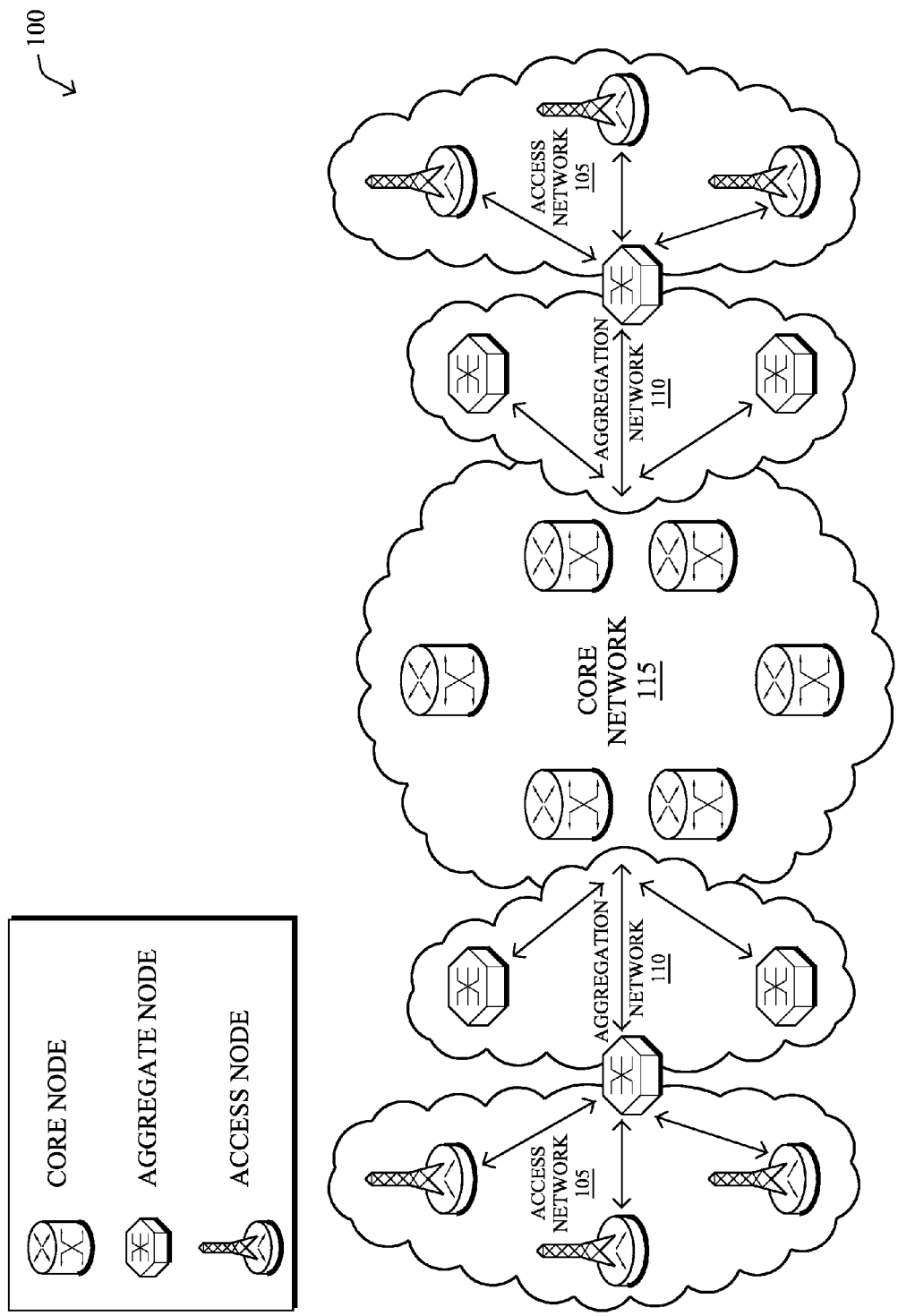
FIG. 1 illustrates an example communication network.

FIG. 1 is a schematic block diagram of an example telecommunication network hierarchy, denoted generally by reference character 100. Network 100 illustratively comprises sub-networks having corresponding nodes/devices such as access nodes, aggregation nodes, core nodes, etc. These nodes can include devices such as, e.g., routers, switches, computers, network devices, etc. Illustratively, network 100 includes an infrastructure of sub-networks or domains organized into an access network 105, an aggregation network 110, and a core network 115. These sub-networks can use independent inter gateway protocol (IGP)/label distribution protocols (LDP) to communicate amongst respective nodes while cross network communication can use various inter-domain protocols, border gateway protocols, label switched paths, etc., as will be appreciated by those skilled in the art. Devices that communicate between domains are border routers (e.g., the aggregation nodes), and typically include label switching routers. These border routers can also be border gateway protocol route reflectors for BGP address families and support services such as labeled unicast services, virtual private network (VPN) services, virtual private wire services (VPWS), virtual private line services (VPLS, etc. In this fashion, network 100, including sub-networks 105, 110, and 115, supports MPLS LSP connectivity, which, as discussed in greater detail below, supports BGP route filtering techniques. For example, BGP outbound route filtering (ORF) can control distribution of inter-domain BGP forwarding equivalent classes (FECs) to particular nodes as required for message routing).

Notably, each of the sub-network nodes/devices is interconnected by various methods of communication. For instance, the communication links may be wired links or shared media (e.g., wireless links, etc.). Those skilled in the art will understand that any number of nodes, devices, links, etc. may be used in network 100, and that the view shown herein is for simplicity. Also, those skilled in the art will further understand that while network 100 is shown in a certain orientation, particularly with access nodes, aggregation nodes, and core nodes, network 100 is merely an example illustration that is not meant to limit the disclosure.

Figure 2:
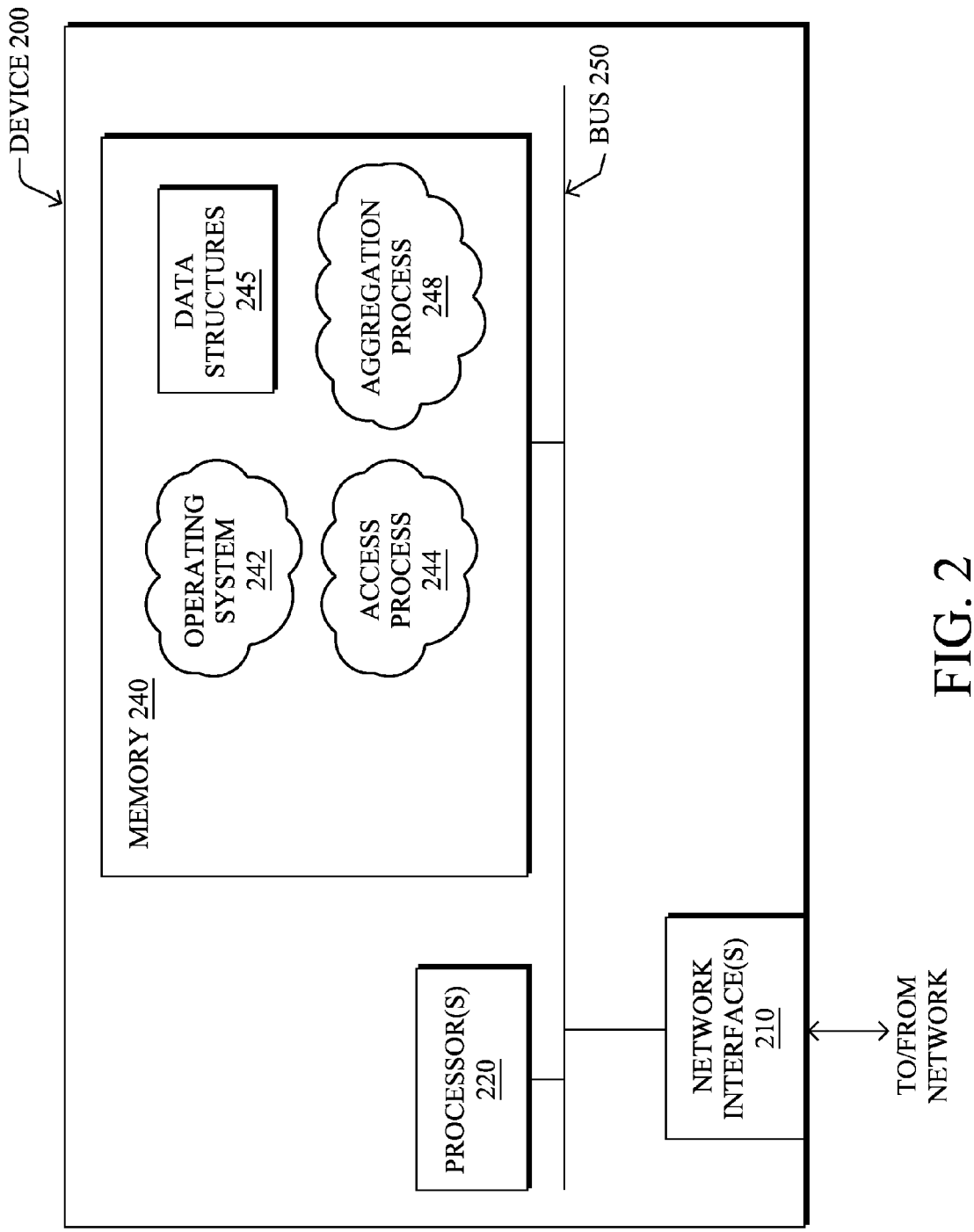
FIG. 2 illustrates an example network device/node.

FIG. 2 is a schematic block diagram of an example node/device 200 that may be used with one or more embodiments described herein, e.g., as any of the access, aggregation or core nodes shown in FIG. 1 above. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over network 100. Network interfaces 210 may be configured to transmit and/or receive data using a variety of different communication protocols. Note that each device may include one or more different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise access process/services 244, and an aggregation process 248, as described herein, particularly whether the device is an access node or an aggregation node, respectively. Note that while processes 244 and 248 are shown in centralized memory 240, additional embodiments provide for one or more of the processes to be specifically operated within the network interfaces 210.

Access process 244 and aggregation process 248 may comprise computer executable instructions executed by the processor 220 to perform functions provided by one or more routing protocols, such as Interior Gateway Protocol (IGP) (e.g., Open Shortest Path First, (OSPF), and Intermediate-System-to-Intermediate-System, (IS-IS)), Border Gateway Protocol (BGP), Internet Protocol (IP), etc.), as will be understood by those skilled in the art. In addition, access process 244 and aggregation process 248 can support Multiprotocol Label Switching (MPLS), which integrates information about network links (bandwidth, latency, utilization) into Internet Protocol (IP) within a network 100 in order to simplify and improve data packet exchange. These functions may, on capable devices, be configured to manage a routing/forwarding table (e.g., a data structure 245) containing, e.g., data used to make routing/forwarding decisions. For example, routing connectivity can be discovered and known prior to computing routes to any destination in the network link state routing.

Each of the techniques described herein may be performed by hardware, software, and/or firmware, such as in accordance with processes 244, 248, or a combination thereof, which may contain computer executable instructions executed by the processor 220 (or independent processor of interfaces 210). In addition, while processes 244 and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, recent growth in mobile data traffic is challenging legacy network infrastructure capabilities. For example, Long Term Evolution (LTE) provides a newer standard for wireless (e.g., cellular) communication for high-speed data. LTE is based on and coexists with a variety of existing technologies such as, Global System for Mobile Communications (GSM), Enhanced Data rates for GSM Evolution (EDGE), Universal Mobile Telecommunications System (UMTS), and High Speed Packet Access (HSPA), etc. To coexist with such mobile services on a common network infrastructure, a virtualized MPLS transport is often applicable and requested by many operators.

A common deployment scenario is MPLS VPN transport for LTE (e.g., "S1" and "X2" with layer-3 and layer-2 virtualization options for the rest of the services, as will be understood in the art). Extending MPLS transport to the mobile access network allows LTE backhaul networks to benefit from a flexible and contiguous transport between cell sites (e.g., for X2 connectivity), and from cell site up to the mobile packet core (e.g., for S1 connectivity).

Generally, LTE drives an increased number of cell sites that may range in the order of tens or hundreds of thousands in large geographies. This places new demands on the Operations and Maintenance of the network and the 3GPP Self-Organizing Networks (SON) functionality, Automatic Neighbor Relation (ANR) being seen as an important aspect of simplified operations. The exponential increase in cell sites combined with the generally all-IP flat network architecture of LTE leads to an increase of route scale in the mobile backhaul network. This increase in route scale presents challenges in maintaining transport connectivity between resource-constrained MPLS enabled cell sites (Base Transceiver Station (BTS) or Cell Site Gateway) since the neighbor cell Relations are not known a priori.

The techniques herein allow for the MPLS VPN topology for LTE (e.g., LTE X2) to be self-organizing while respecting the scale restrictions. That is, the techniques described herein alleviate stress placed on conventional network infrastructure capabilities and ensure high-performance of data transmission within telecommunication networks via an extension or application of multiprotocol label switching (MPLS). MPLS provides for "virtual links" or "tunnels" between distant nodes (e.g., access nodes, aggregation nodes, core nodes, etc.) and encapsulates data packets of various network protocols. As described herein, the techniques provide a self organizing and scalable MPLS virtual private network (VPN) transport for LTE. In addition, deploying MPLS and MPLS virtual private network (VPN) techniques for LTE telecommunication networks such as mobile access networks (e.g., BTS, Cell Site Gateways, etc.) allows LTE backhaul to benefit from flexible and contiguous transport between cell site nodes (e.g., layer 2 connectivity), and provides contiguous transport of data from cell site nodes to the core nodes (e.g., layer 1 connectivity). These techniques further provide for dynamically updating MPLS VPN route and automating inter-domain label filtering (e.g., border gateway protocol label switched path (BGP LSP) filtering), which enables seamless connectivity to destination nodes in a scaled network, while respecting scalability restrictions of an Access Network (e.g., control and data plane restrictions).

Illustratively, a Unified MPLS transport is assumed for the fixed and mobile services (e.g., as defined by the IETF RFC 3107). The transport infrastructure may be organized as shown in FIG. 1, such as with Core, Aggregation, Access Networks, each running independent IGP/LDP domains and interconnected with BGP IPv4/v6 unicast+label hierarchical LSPs. The Border Routers between domains are LSRs for the inter domain labeled BGP LSPs. The Border Routers can be BGP Route Reflectors for a labeled unicast address family, which announce themselves as next-hops. Alternatively, or in addition thereto, the Border Routers may be BGP Route Reflectors for BGP address families responsible for VPNv4/v6, VPWS/VPLS services while not changing the next-hops, as will be understood in the art. This enables the IGP/LDP network domains to have limited scale while allowing inter-domain MPLS LSP connectivity. The scaling for the inter-domain labeled BGP LSPs in the various network layers can be controlled with BGP route filtering techniques.

In particular, a BGP Outbound Route-map Filtering mechanisms is assumed at the boundary between the Aggregation and Access Network at its Border Router with the target of limiting the inter domain BGP FECs distributed in the access Network only to the required service next hops. This enables the Access Nodes to have low control and data plane scale (below hundred of prefixes and labels related to inter and intra domain LSP destinations associated with the S1 and X2 LTE traffic flows and destinations).

The techniques herein define a mechanism that may be used by the access nodes for automating the inter-domain BGP LSP ORF filter definitions in the aggregation nodes. Illustratively, the techniques described herein may be performed by hardware, software, and/or firmware, such as in accordance with the "access" process 244 or "aggregation" process 248, which may contain computer executable instructions executed by the processor 220 (or independent processor of interfaces 210) to perform functions relating to the techniques described herein. For example, the techniques herein may be treated as extensions to conventional protocols, such as the various telecommunication protocols, and as such, may be processed by similar components understood in the art that execute those protocols, accordingly.

Operationally, under the control of access process 244, a device can act as an access device/node. According to access process 244, the access device receives a message destined for a particular address, and determines that no border gateway protocol (BGP) label switched path (LSP) is mapped for the particular address (e.g., at the access node itself). For example, the access node can determine that the BGP LSP does not exist in a forwarding table. If the BGP LSP does not exist, the access device can further trigger an aggregation node (e.g., a border gateway protocol network (BGP) node) to update outbound route filtering (ORF) to permit advertisements for the particular address. Once the ORF is updated, the access node can receive, via advertisements, a BGP forwarding equivalent class (FEC) for an LSP mapped to the particular address. The access node can the transmit messages destined for the particular address from the access node to a subsequent node of the LSP according to the BGP FEC for the LSP.

In one or more embodiments of the techniques herein, the access process 244, when executed by the access node, can trigger the aggregation node to update the ORF to prevent advertisements for the particular address (e.g., after a threshold amount of time has elapsed).

In other embodiments, under the control of aggregation process 248, a device can act as an aggregation device/node (e.g., a border gateway protocol (BGP) network node). According to aggregation process 248, the aggregation device can receive a request from an access node (e.g., a device under the control of access process 244) to permit advertisements destined for a particular address. The advertisements are typically filtered by outbound route filtering (ORF) at the aggregation node. The aggregation node can further update the ORF to permit the advertisements and transmit, via advertisements in response to the updated ORF, a border gateway protocol (BGP) forwarding equivalent class (FEC) for a label switched path (LSP) to the particular address to the access node.

In some embodiments, as discussed above, the aggregation node can receive instruction (e.g., from an access node) that causes the aggregation node to prevent advertisements for the particular address via updating the ORF after a threshold amount of time (e.g., a threshold amount of time elapsing from transmission of the BGP FEC for the LSP to the Access node).

For example, FIGS. 3-7 illustrate a progression of the above-described techniques (e.g., access process 244 and aggregation process 248) and illustrate dynamically updating MPLS VPN routes and inter-domain label filtering (e.g., outbound route filtering by an aggregation node). In particular, according to the progression in FIGS. 3-7, an aggregation node dynamically updates its BGP ORF for a next hop (e.g., a BGP auto-discovered next hop), when the next hop is not currently present in the routing information base (RIB) at the access node (e.g., a BGP LSP for the message does not exist in a forwarding table at the access node). The updated BGP ORF triggers the aggregation node (e.g., border router) to distribute the BGP FEC to access nodes, which can install and use the corresponding new LSP.

Figure 3:
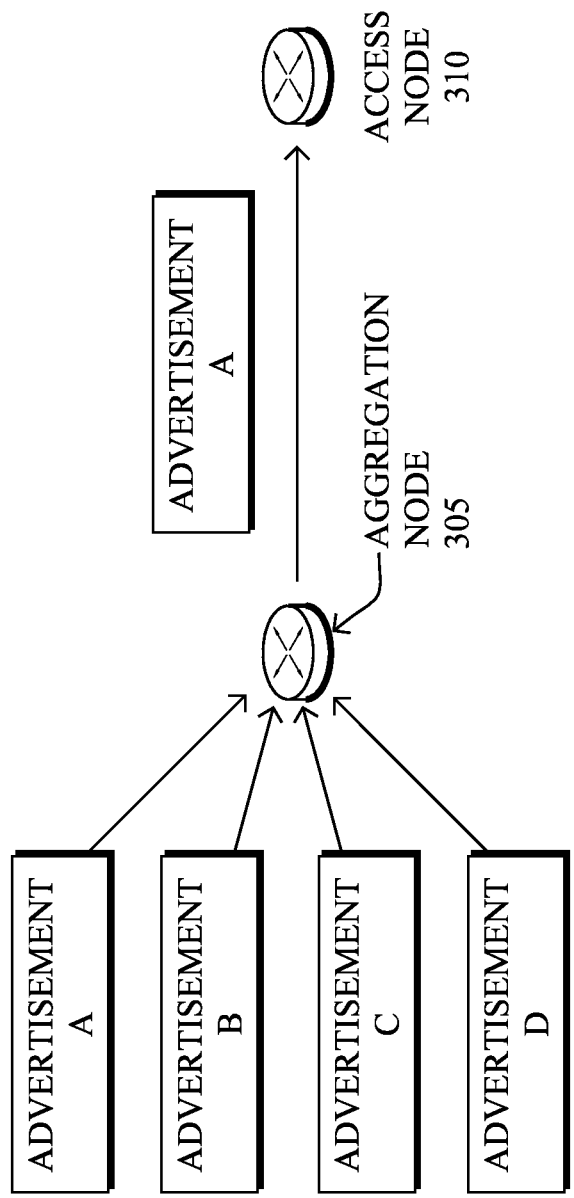
FIG. 3 illustrates an example view of data communication with respect to an aggregation node network node and an access node.

In particular, FIG. 3 illustrates an example view of data communication with respect to an aggregation node 305 (e.g., a border gateway protocol network node or a border router) and an access node 310. As illustrated, aggregation node 305 filters messages (e.g., advertisements A-D) and only permits advertisement A to reach access node 310. Aggregation node 305 can filter messages via known filtering techniques such as outbound route filtering (ORF), as appreciated by those skilled in the art. Notably, each advertisement corresponds to a particular destination or address.

Figure 4:
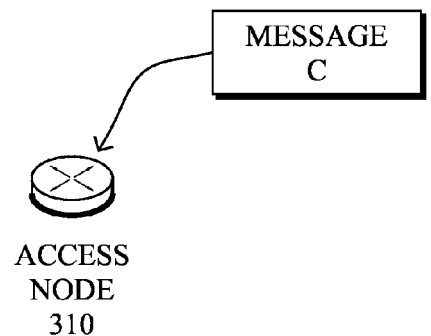
FIG. 4 illustrates an example view of the access node receiving a message.

FIG. 4 illustrates an example view of access node 310 receiving a message C. Access node 310 can receive message C via for example, data plane snooping and interception of messages. Notably, message C has a corresponding advertisement C, which is filtered by aggregation node 305 (ref. FIG. 3). Accordingly, access node 310 determines that it needs next hop information since no border gateway protocol (BGP) label switched path (LSP) exists or no BGP LSP is currently mapped at the access node for the particular address (e.g., advertisement C). For instance, the access node can determine that the BGP LSP does not exist in a forwarding table. For example, when a connected end device (e.g., an "eNB") initiates a remote X2 connection, the access node intercepts the IP flow in the data plane and if unable to forward it (while not having VPN routing defined for it) initiates an RT constrained procedure (RFC 4684) asking the Border Router (route reflector for the VPN AFI/SAFI) for the RT of the remote eNB, the requested RT being derived or constructed from the destination IP address of the intercepted X2 flow. (Note that when the connected eNB uses DHCP, the access node enables DHCP relay or server, and the IP address offered in DHCP OFFER is enabled as a connected static route and redistributed in the BGP VPN v4 AFI/SAFI with its associated RT.)

Figure 5:
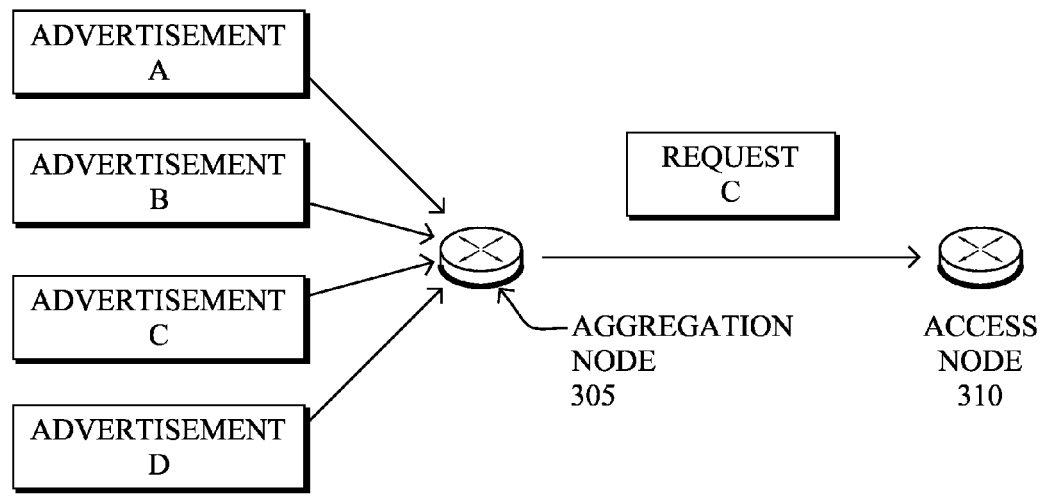
FIG. 5 illustrates an example view of the access node requesting advertisements for a particular address from the aggregation node.

FIG. 5 illustrates an example view of access node 310 requesting, via request C, is advertisements for a particular address (e.g., advertisement C) from aggregation node 305. As discussed above, advertisement C is filtered by the outbound route filtering at aggregation node 305 (ref. FIG. 3). Request C, once received by aggregation node 305, triggers aggregation node 305 to update outbound route filtering (ORF) to permit advertisements for the particular address (e.g., Advertisement C). Access node 310 can request advertisements via route target (RT) constraints, as known by those skilled in the art (e.g., as described in the Internet Engineering Task Force (IETF) Request for Comment (RFC) 4684, where an access node may use the RT Constraint mechanism to request BGP routes to a particular IP address). For example, those skilled in the art will understand that access nodes connecting eNBs (with or without Dynamic Host Configuration Protocol (DHCP)) typically advertise a VPN route for the connected eNBs with an RT that is algorithmically built from corresponding IP addresses. This same algorithm can be used when a remote access node attempts to reach an eNB, but has no route to it. Put differently, an RT constrained request is generally for an RT value built from a destination address of an X2 packet according to the same algorithm used when a corresponding access node (e.g., a provider edge (PE)) exported/advertised that address. Notably, a remote access node can export a route for the destination address by adding a RT constructed from the destination address based on an algorithm, which algorithm is used by the access node when constructing the RT request for the destination address. Notably, the route can be static (e.g., configured by the operator when DHCP is used) or dynamic (e.g., when DHCP is used on the eNB).

Figure 6:
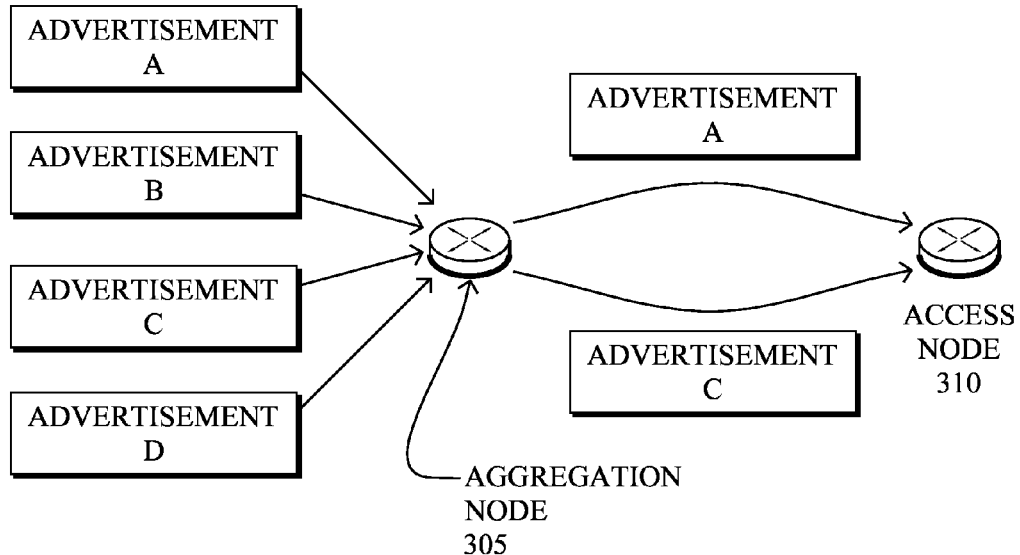
FIG. 6 illustrates an example view of updated outbound route filtering (ORF) at the aggregation node and transmission of advertisements to the access node.

FIG. 6 illustrates an example view of updating outbound route filtering (ORF) at the aggregation node and transmission of advertisements to the access node. In particular FIG. 6 illustrates advertisement A and advertisement C received by access node 310. In this fashion, access node 310 receives, via advertisements, a BGP forwarding equivalent class (FEC) for a label switched path (LSP) mapped to the particular address.

Figure 7:
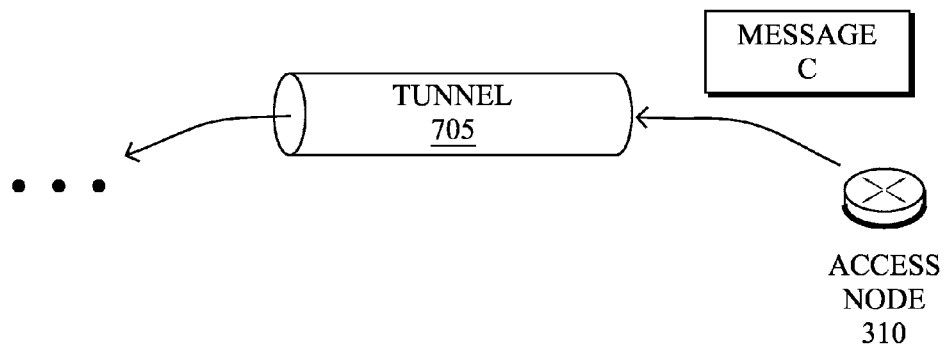
FIG. 7 illustrates an example view of the access node transmitting messages destined for the particular address according to the BGP forwarding equivalent class (FEC) for the label switched path (LSP)

Accordingly, with reference to FIG. 7, access node 310 can transmit messages (e.g. message C) destined for the particular address according to the BGP FEC for the LSP. As shown in FIG. 7, access node 310 transmits message C to tunnel 705. Tunnel 705 can be a virtual private network (VPN) tunnel and can represent any number of subsequent nodes, as is appreciated by those skilled in the art.

In some embodiments, access node 310 can further trigger aggregation node 305 to update the ORF to prevent advertisements for the particular address (e.g., FIG. 3). Access node 305 can trigger the aggregation node 305 to update the ORF after a threshold amount of time, which can be measured as time elapsed since access node 310 receives a message for the particular address.

Thus, FIGS. 3-7 illustrate the progression of dynamically updating MPLS VPN routes (e.g., FIG. 7) and inter-domain label filtering (e.g., outbound route filtering by an aggregation node), such that the progression in FIGS. 3-7 illustrate the aggregation node dynamically updating BGP ORF, as described above. The updated BGP ORF triggers the aggregation node (e.g., border router) to distribute the BGP FEC to access nodes, which can install and use the corresponding new LSP. For instance, once the correspondent VPN routes are received (e.g., based on RFC 4684 procedures), the access node updates the inter-domain BGP LSP ORF filter with the new service next hop, if this next hop is not already in the RIB (based on IGP or BGP IPv4 unicast routing). In this way the illustrative MPLS VPN X2 topology and the required inter-domain labeled BGP LSP may be updated dynamically while maintaining low scalability in the access node. (Note that an eNB typically has up to 20 remote eNB X2 relations. Also, the MPLS VPN may integrate 100,000 access nodes (cell sites).)

Figure 8:
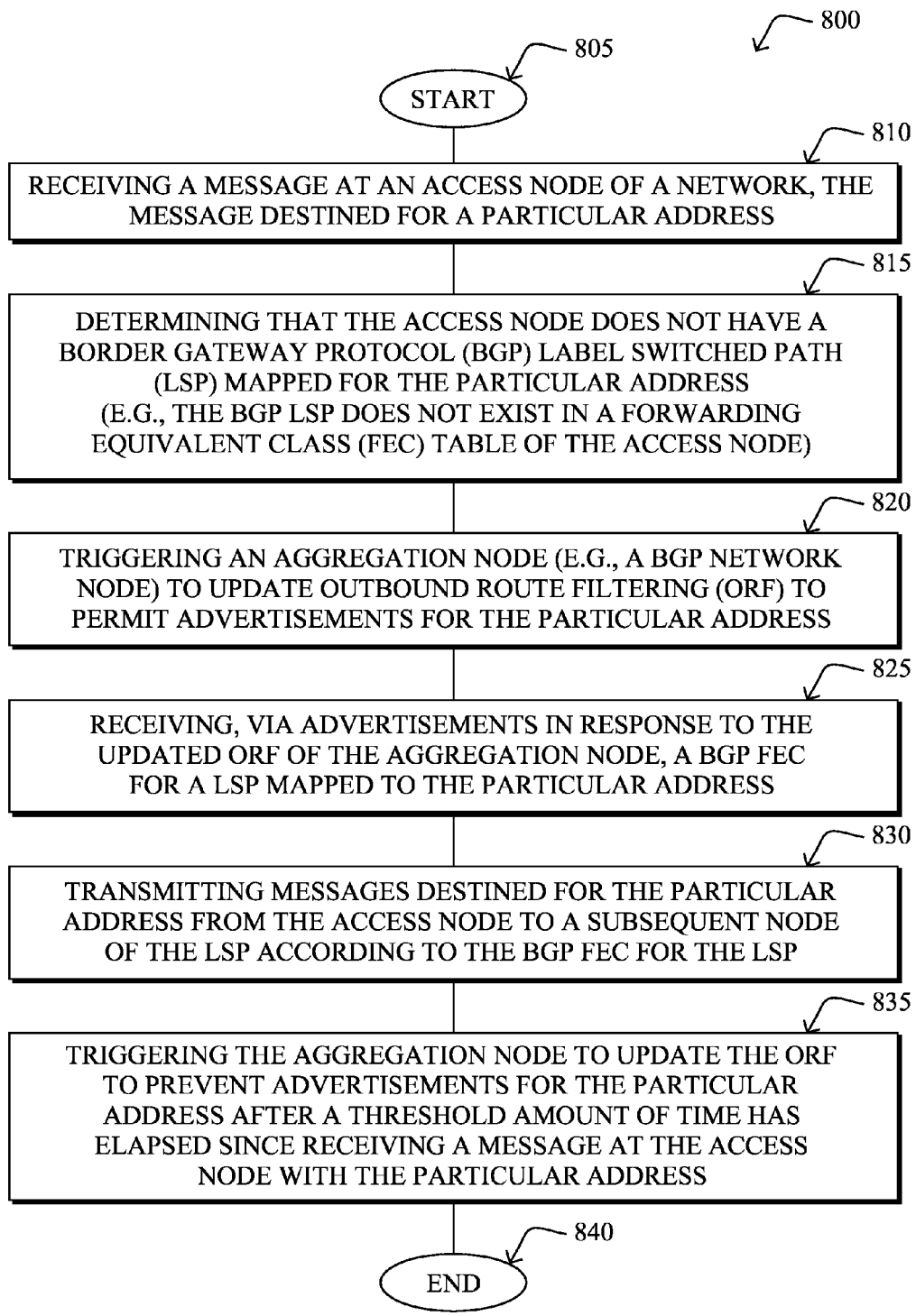
FIG. 8 illustrates an example simplified procedure for routing messages to a particular address via an access node.

FIG. 8 illustrates an example simplified access procedure 800 for routing messages for a particular address in accordance with one or more embodiments described herein, particularly from the perspective of an access device/node. The procedure 800 starts at step 805, and continues to step 810, where, as described in greater detail above, the access node receives a message at an access node of a network, the message destined for a particular address. In step 815, the access node (e.g., access node 310) can determine that the access node does not have a border gateway protocol (BGP) label switched path (LSP) mapped for the particular address (e.g., the BGP LSP may not exist in a forwarding equivalent class (FEC) table at the access node). As discussed above, in step 820, the access node 310 can trigger an aggregation node (e.g., aggregation node 305) to update outbound route filtering (ORF) to permit advertisements for the particular address. Notably, aggregation node, as discussed above can be a BGP network node, a border router, etc. In response to an updated ORF at the aggregation node, in step 825, the access node receives a BGP FEC for a LSP mapped to the particular address. Next, in step 830, the access node can transmit messages destined for the particular address to a subsequent node of the LSP according to the BGP FEC for the LSP. In some embodiments, the access node in step 835 can further trigger the aggregation node to update the ORF to prevent advertisements for the particular address after a threshold amount of time has elapsed (e.g. a time-to-live time period elapses). The procedure 800 may subsequently end in step 840, or, may return to step 805 to receive a message at an access node.

Figure 9:
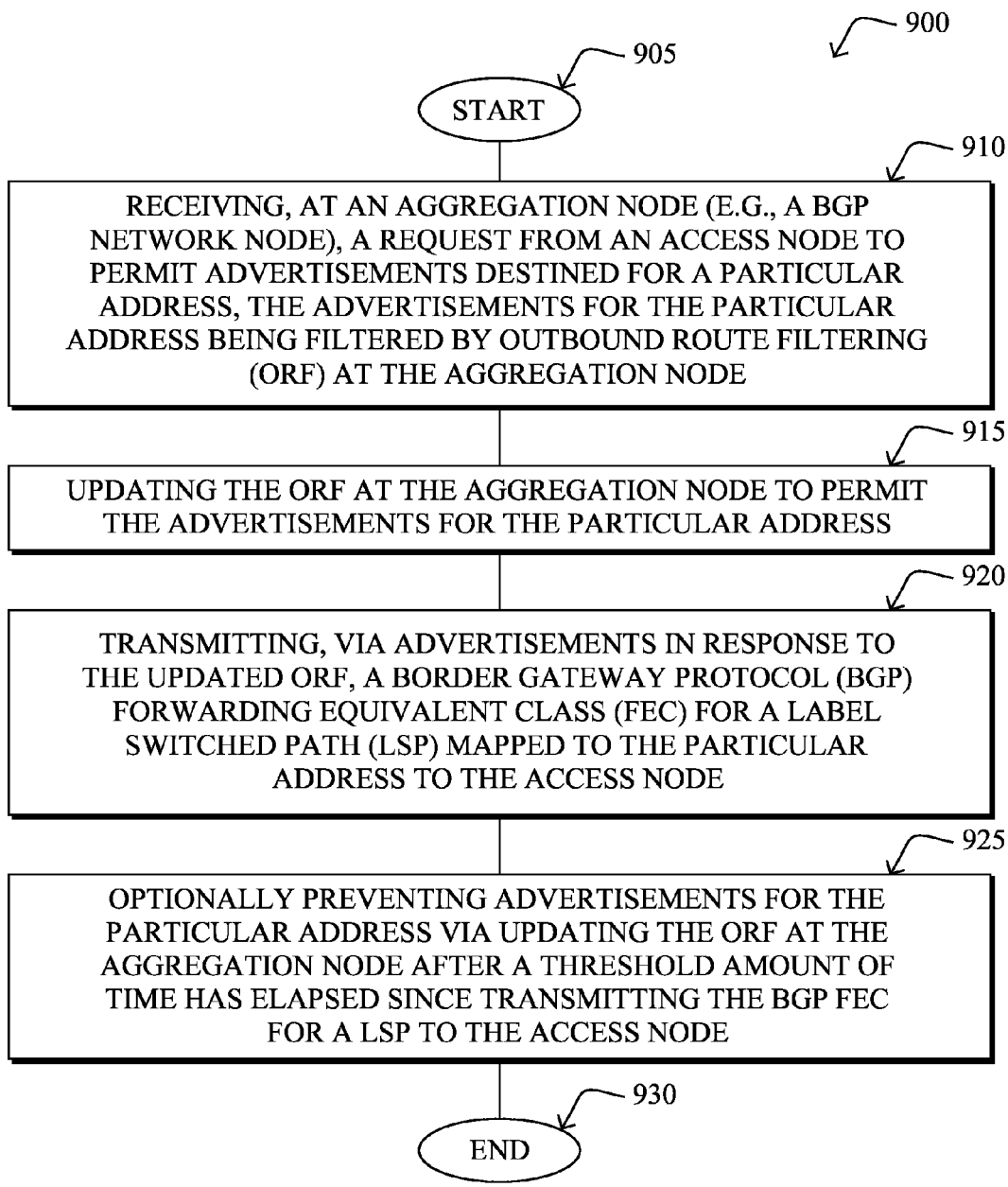
FIG. 9 illustrates an example simplified procedure for dynamically updating ORF of the aggregation node in response to a request from the access node.

In addition, FIG. 9 illustrates an example simplified access procedure dynamically updating ORF of the aggregation node in response to a request from the access node in accordance with one or more embodiments described herein, particularly from the perspective of the aggregation device/node (e.g., aggregation node 305). The procedure 900 starts at step 905, and continues to step 910, where, as described in greater detail above, the aggregation node receives a request from an access node to permit advertisements destined for a particular address. Typically, these advertisements are filtered by outbound route filtering (ORF) at the aggregation node. Next, in step 915, the aggregation node can update the ORF to permit or allow the advertisements for the particular address. In response to the updated ORF, in step 920, the aggregation node transmits (via advertisements) a boarder gateway protocol (BGP) forwarding equivalent class (FEC) for a label switched path (LSP) mapped to the particular address to the access node. Moreover, in some embodiments, as shown in step 925, the aggregation node can further prevent advertisements for the particular address via updating the ORF after a threshold amount of time has elapsed (e.g., since transmitting the BGP FEC for a LSP to the access node). However, in these embodiments, as is understood by those skilled in the art, care must be taken to configure proper time-out exceptions since preventing advertisements after a particular amount of time can impact control plane performance and X2 services. The procedure 900 may subsequently end in step 925, or, may return to step 905 to receive a request from an access node.

Figure 10A:
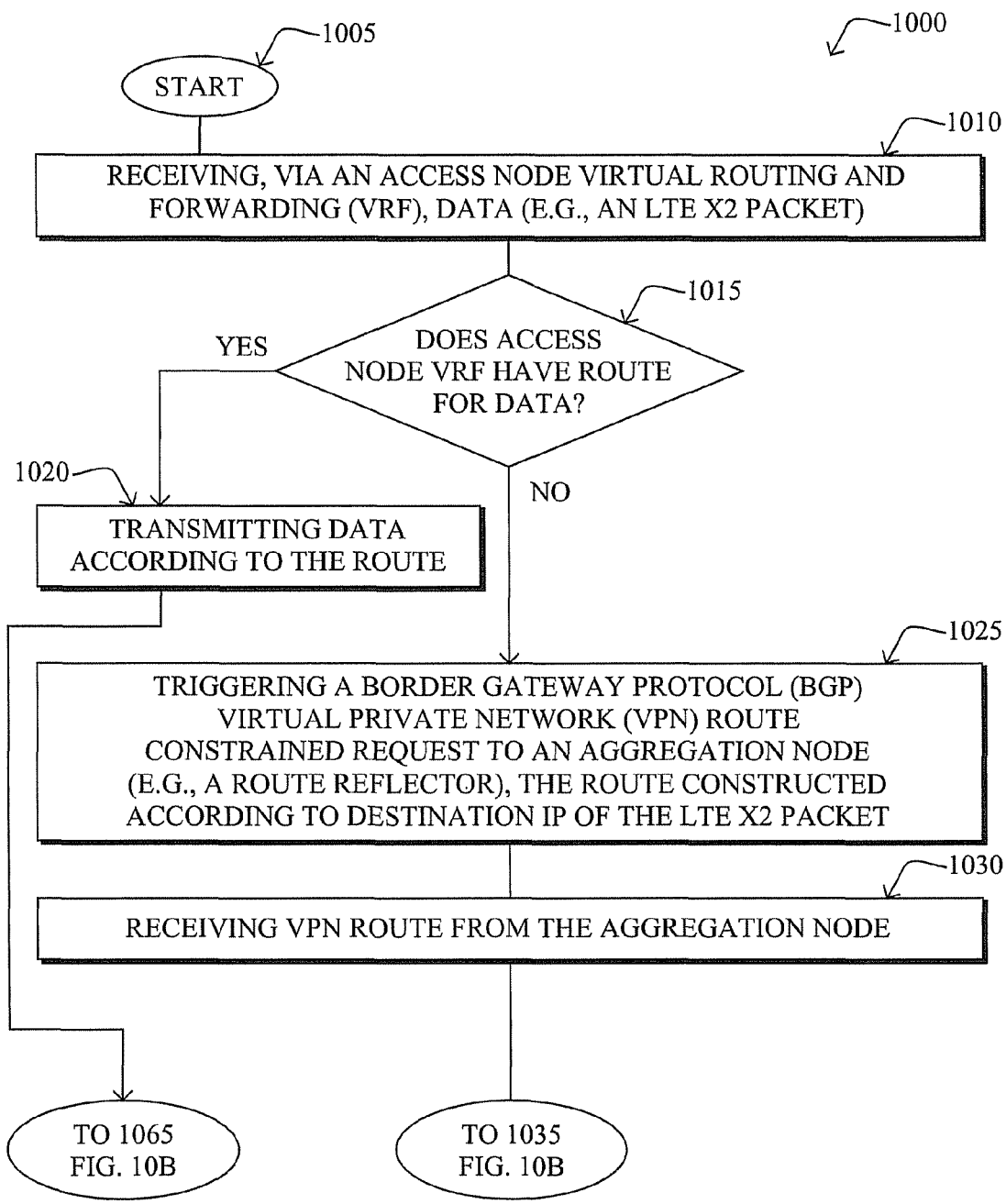
FIGS. 10A-10B illustrate an example specific implementation of the techniques described above for a self-organizing and scalable multiprotocol label switching (MPLS) virtual private network (VPN) transport for long term evolution (LTE).
Figure 10B:
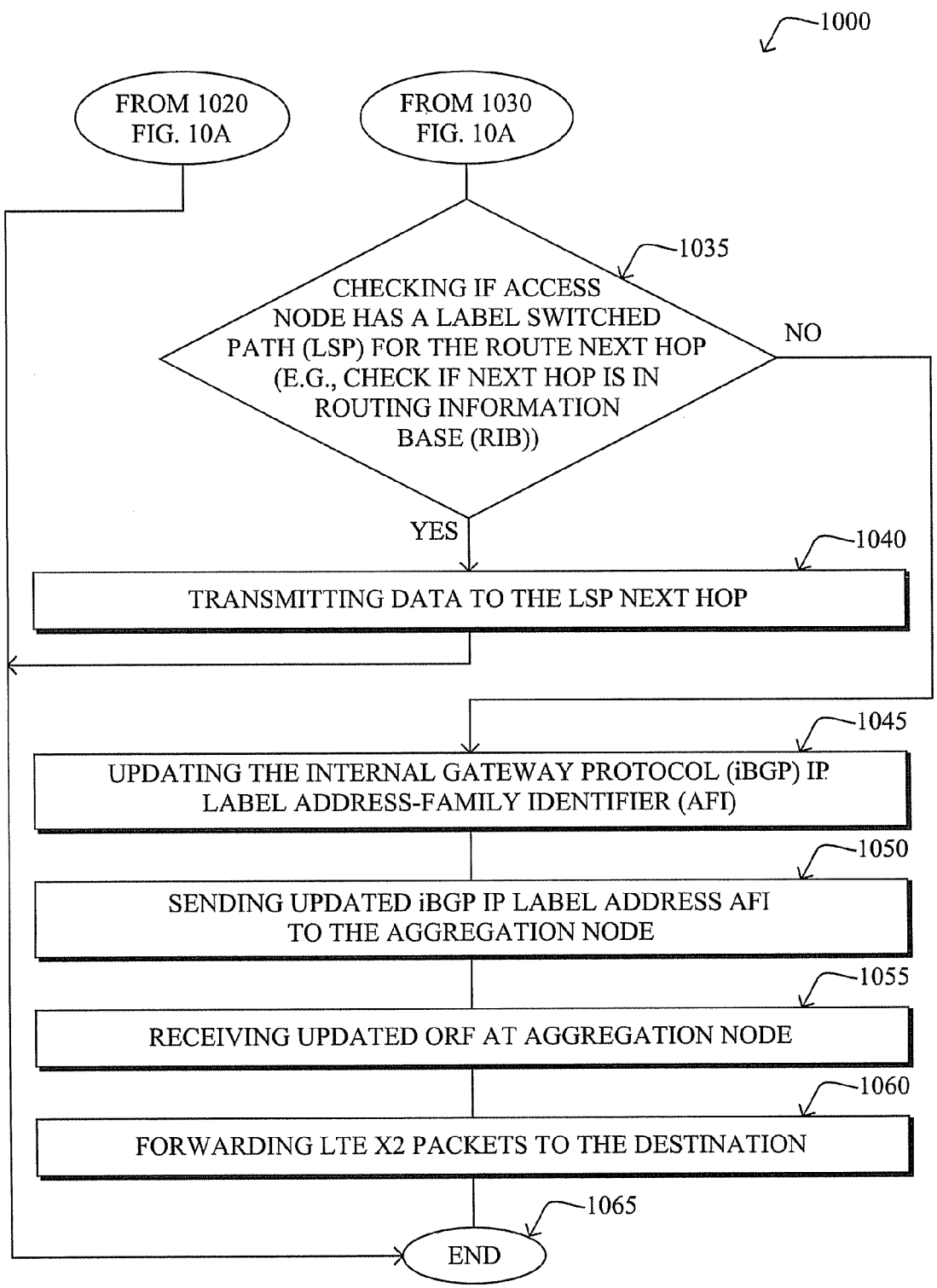

As a specific example of the techniques described above, FIGS. 10A-10B illustrate an example implementation of the techniques herein for a self-organizing and scalable MPLS VPN transport for LTE, particularly from the perspectives of the access device/node (e.g., access node 310) and the aggregation device/node (e.g., aggregation node 305). Notably, the procedure 1000 is broken across FIGS. 10A-10B. In particular, FIG. 10A includes steps 1005 through steps 1030, and FIG. 10B includes steps 1035 through steps 1065.

The procedure 1000 starts at step 1005, and continues to step 1010, where, as described in greater detail above, the access node receives (via virtual routing and forwarding (VRF)) data such as an LTE X2 packet. Next, in step 1015, the access node determines if it has route information for the data. If the access node determines that it has a route for the data, it will transmit the data according to the route in step 1020. However, in step 1015, if the access node determines that it does not have a route for the data, then in step 1025 the access node triggers a BGP VPN route target (RT) constrained request to an aggregation node (e.g., a route reflector). Notably, the RT can be constructed according to a destination IP address of the LTE X2 packet. As noted above, the RT constrained request is generally for an RT value built from the destination address of the X2 packet according to the same algorithm used when a corresponding access node (e.g., a provider edge (PE)) exported/advertised that address.

In response to the requested RT, in step 1030 the access node receives the VPN route from the aggregation node. In step 1035, the access node checks if it has an LSP for the route next hop. For example, the access node may check if the next hop is in its RIB (e.g., in IGP or BGP). If the access node has an LSP, then the access node transmits the data to the LSP next hop in step 1040, accordingly. However, if the access node does not have an appropriate LSP in step 1035, then in step 1045 the access node triggers an update to the interior BGP (iBGP) IP+label address-family identifier (AFI). Next, in step 1050, the access node sends the updated iBGP IP+label AFI ORF to the aggregation node and, in step 1055, the aggregation node may receive updated outbound route filtering (ORF) from the access node. As is understood by those skilled in the art, the ORF can be created and updated by the access node and sent to the aggregation node (e.g., a route reflector), which implements filtering according to the updated ORF. That is, the access node updates the VPN next hop in the ORF, sends the updated ORF to the aggregation node, and receives a route for the next-hop and label for the next-hop. In this fashion, once the access node receives the route for the next-hop, the access node, in step 1060, can forward LTE X2 packets to the destination. Note that intermediate packets during the procedure 1000 may be dropped until the routing update has been performed. The procedure 1000 may subsequently end in step 1065, or, may return to step 1005 to receive additional data.

It should be noted that while certain steps within procedures 800-1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

The techniques described herein, therefore, provide for self-organizing MPLS LSP techniques, via access and aggregation nodes within in a telecommunication network, as well as VPN (e.g., VPN X2) related self-organization and its triggering of the MPLS transport self-organization. In particular, the techniques herein dynamically determine if destination information does not exist at an access node, triggers an aggregation node to update outbound route filtering (ORF), and provide BGP LSP for FEC information about the message to the access node for further routing. The techniques described herein can be deployed for fixed and mobile services, and impose minimal operational alignment between transport and radio access network operations. These techniques respect scalability restrictions in the network access layer and can be applied to any telecommunication network.

While there have been shown and described illustrative embodiments that provide for dynamic self-organizing MPLS LSP techniques in a telecommunication network, it is to be understood that various other adaptations and modifications may be made within the spirit and scope of the embodiments herein. For example, the embodiments have been shown and described herein with relation to LTE configurations. However, the embodiments in their broader sense are not as limited, and may, in fact, be used with other types of telecommunication networks and/or protocols. In addition, while certain protocols are shown, such as MPLS, other suitable protocols may be used, accordingly. Also, while the techniques generally describe initiation and determinations by access nodes and aggregation nodes, various other devices can be employed to perform these determinations without departing from the spirit and scope of this disclosure.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving a message at an access node of a network, the message destined for a particular address;
   determining that the access node does not have a border gateway protocol (BGP) label switched path (LSP) mapped for the particular address;
   triggering an aggregation node to update outbound route filtering (ORF) to permit advertisements for the particular address;
   receiving, via advertisements in response to the updated ORF of the aggregation node, a BGP forwarding equivalent class (FEC) for an LSP mapped to the particular address; and
   transmitting messages destined for the particular address from the access node to a subsequent node of the LSP according to the BGP FEC for the LSP.

2. The method of claim 1, wherein the aggregation node is a border gateway protocol network node.

3. The method of claim 1, wherein determining that the access node does not have a BGP LSP mapped for the particular address comprises:
   determining, by the access node, that the BGP LSP does not exist in a forwarding table of the access node.

4. The method of claim 1, further comprising:
   determining the particular address via data snooping in a data plane of the network.

5. The method of claim 1, further comprising:
   triggering the aggregation node to update the ORF to prevent advertisements for the particular address after a threshold amount of time has elapsed since receiving a message at the access node with the particular address.

6. The method of claim 1, wherein in response to receiving the message at an access node of a network, but prior to determining that the access node does not have the BGP LSP mapped for the particular address, the method further comprising:
   in response to receiving the message at the access node, determining, via the access node, whether the access node has a route according to virtual routing and forwarding information of the access node;
   triggering a BGP virtual private network (VPN) route target constrained request to the aggregation node, the route target constructed according to a destination of the message; and
   receiving a VPN route for the message from the aggregation node, wherein determining that the access node does not have the BGP LSP mapped for the particular address is based on not having an LSP to a next hop node of the received VPN route.

7. A method, of claim 6, wherein a remote access node exports a route for the destination by adding a route target constructed from the destination address based on an algorithm, and wherein the access node constructs the route target according to the destination using the same algorithm.

8. A method, comprising:
   receiving, at an aggregation node, a request from an access node to permit advertisements destined for a particular address, the advertisements for the particular address being filtered by outbound route filtering (ORF) at the aggregation node;
   updating the ORF at the aggregation node to permit the advertisements for the particular address; and
   transmitting, via advertisements in response to the updated ORF, a border gateway protocol (BGP) forwarding equivalent class (FEC) for a label switched path (LSP) mapped to the particular address to the access node.

9. The method of claim 8, wherein the aggregation node is a border gateway protocol (BGP) network node.

10. The method of claim 9, further comprising:
    preventing advertisements for the particular address via updating the ORF at the aggregation node after a threshold amount of time has elapsed since transmitting the BGP FEC for the LSP to the access node.

11. An apparatus within a network, comprising:
    one or more network interfaces to communicate as an access node within a computer network;
    a processor coupled to the network interfaces and to execute one or more processes; and
    a memory configured to store a process executed by the processor, the process when executed to:
    receive a message destined for a particular address;
    determine that the access node does not have a border gateway protocol (BGP) label switched path (LSP) mapped for the particular address;
    trigger an aggregation node to update outbound route filtering (ORF) to allow advertisements for the particular address;
    receive, in response to the updated ORF of the aggregation node, a BGP forwarding equivalent class (FEC) for an LSP mapped to the particular address; and
    transmit messages destined for the particular address to a subsequent node of the LSP according to the BGP FEC for the LSP.

12. The apparatus of claim 11, wherein the aggregation node is a border gateway protocol network node.

13. The apparatus of claim 11, wherein the messages destined for the particular address are transmitted along a virtual private network (VPN) tunnel.

14. The apparatus of claim 11, wherein the process, when executed by the processor to determine that the access node does not have a BGP LSP mapped for the particular address, further causes the processor to:
    determine that the BGP LSP does not exist in an access node a forwarding table.

15. The apparatus of claim 11, wherein the access node apparatus receives the advertisements destined for a particular address via data snooping in a data plane of the network.

16. The apparatus of claim 11, wherein the process, when executed by the processor, further causes the processor to:
    trigger the aggregation node to update the outbound route filtering (ORF) to prevent advertisements for the particular address after a threshold amount of time.

17. An apparatus within a network, comprising:
    one or more network interfaces to communicate as an aggregation node within a computer network;
    a processor coupled to the network interfaces and to execute one or more processes; and
    a memory configured to store a process executed by the processor, the process when executed to:
    receive a request from an access node to permit advertisements destined for a particular address, the advertisements for the particular address being filtered by outbound route filtering (ORF);
    update the ORF to permit the advertisements for the particular address; and
    transmit, via advertisements in response to the updated ORF, a border gateway protocol (BGP) forwarding equivalent class (FEC) for a label switched path (LSP) mapped to the particular address to the access node.

18. The apparatus of claim 17, wherein the aggregation node is a border gateway protocol (BGP) network node.

19. The apparatus of claim 17, wherein the process, when executed by the processor, further causes the processor to:

prevent advertisements for the particular address via updating the ORF at the aggregation node after a threshold amount of time has elapsed since transmitting the BGP FEC for the LSP to the access node.

20. The apparatus of claim 17, wherein the process, when executed by the processor to transmit the border gateway protocol (BGP) forwarding equivalent class (FEC) for the label switched path (LSP) mapped to the particular address to the access node, further causes the access node to:
transmit messages destined for the particular address to a subsequent node of the LSP according to the BGP FEC for the LSP.

21. The apparatus of claim 20, wherein the messages destined for the particular address are transmitted along a virtual private network (VPN) tunnel.

22. The apparatus of claim 17, wherein an aggregation node updates the ORF to permit the advertisements for the particular address in response to the received request from the access node.

* * * * *

UNITED STATES PATENT AND TRADEMARK OFFICE
CERTIFICATE OF CORRECTION

PATENT NO.      : 9,007,941 B1                               Page 1 of 1
APPLICATION NO. : 13/557910
DATED           : April 14, 2015
INVENTOR(S)     : Miclea et al.

It is certified that error appears in the above-identified patent and that said Letters Patent is hereby corrected as shown below:

In the Specification,

Column 1, line 28 should read as follows:
    referring to the following [[is]] description in conjunction with

Column 2, line 36 should read as follows:
    cally distributed nodes (e.g., devices [[is]] of a distributed data

Column 7, line 32 should read as follows:
    requesting, via request C, [[is]] advertisements for a particular

Signed and Sealed this
Eleventh Day of August, 2015

Michelle K. Lee
*Director of the United States Patent and Trademark Office*